May 7, 1935.　　　　　　E. POHL　　　　　　2,000,497

METHOD OF AND APPARATUS FOR MAKING RÖNTGEN PROJECTIONS

Filed Nov. 28, 1928　　　2 Sheets-Sheet 1

Inventor:
E. Pohl
By: Marks & Clerk
Attys.

May 7, 1935.  E. POHL  2,000,497

METHOD OF AND APPARATUS FOR MAKING RÖNTGEN PROJECTIONS

Filed Nov. 28, 1928  2 Sheets-Sheet 2

Inventor:
E. Pohl
By: Marks & Clerk

Patented May 7, 1935

2,000,497

UNITED STATES PATENT OFFICE 2,000,497

METHOD OF AND APPARATUS FOR MAKING RÖNTGEN PROJECTIONS

Ernst Pohl, Kiel, Germany

Application November 28, 1928, Serial No. 322,496
In Germany November 29, 1927

1 Claim. (Cl. 250—34)

My invention relates to improvements in the method of and apparatus for making Röntgen projections, and the object of the improvements is to provide a method by means of which a section of a body can be projected on the screen or a sensitized plate, while the parts of the body located outside the said plane are not made visible on the screen or sensitized plate. With this object in view my invention consists in moving the Röntgen tube, the screen or sensitized plate and the body relatively to each other while making the projection in such a way that similar rays always pass through the same points of the section and the screen or plate, while in all the other parts of the body the said rays pass through varying points of the said parts. Therefore when moving the said members at sufficiently high velocity, each ray produces only the image of the point continuously met thereby on the screen or plate, while the images of the other points which are produced in rapid succession can not be perceived. When taking Röntgen photos the velocity of the movement can be comparatively small, while for the purpose of directly observing the image on the screen the velocity must be so high that the moving images of the points are not perceived by the eye.

In the preferred embodiment of the invention I mount the tube, the screen or plate, and the support for the body so that the tube and the screen perform corresponding gyratory movements, the said parts being supported on universally mounted rods. When oscillating the said rods through a large angle, plastic images can be produced on the screen.

In the foregoing I have stated that the support of the body is stationary, and that the tube and the screen are oscillated. But it will be understood that the same result may be obtained when the said parts are mounted so as to perform similar relative movements, and that for example the Röntgen tube may be stationary, while the body and the screen are oscillated.

Figure 2:
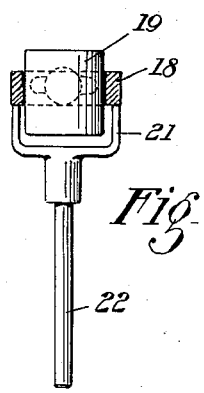
Figure 3:
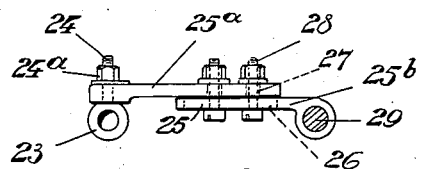

For the purpose of explaining the invention several examples embodying the same have been shown in the accompanying drawings in which the same reference characters have been used in all the views to indicate corresponding parts. In said drawings, Fig. 1 is a perspective view showing an apparatus in which the support for the body is stationary and the Röntgen tube and the screen are movable, Figs. 2 and 3 are detail views.

Figure 1:
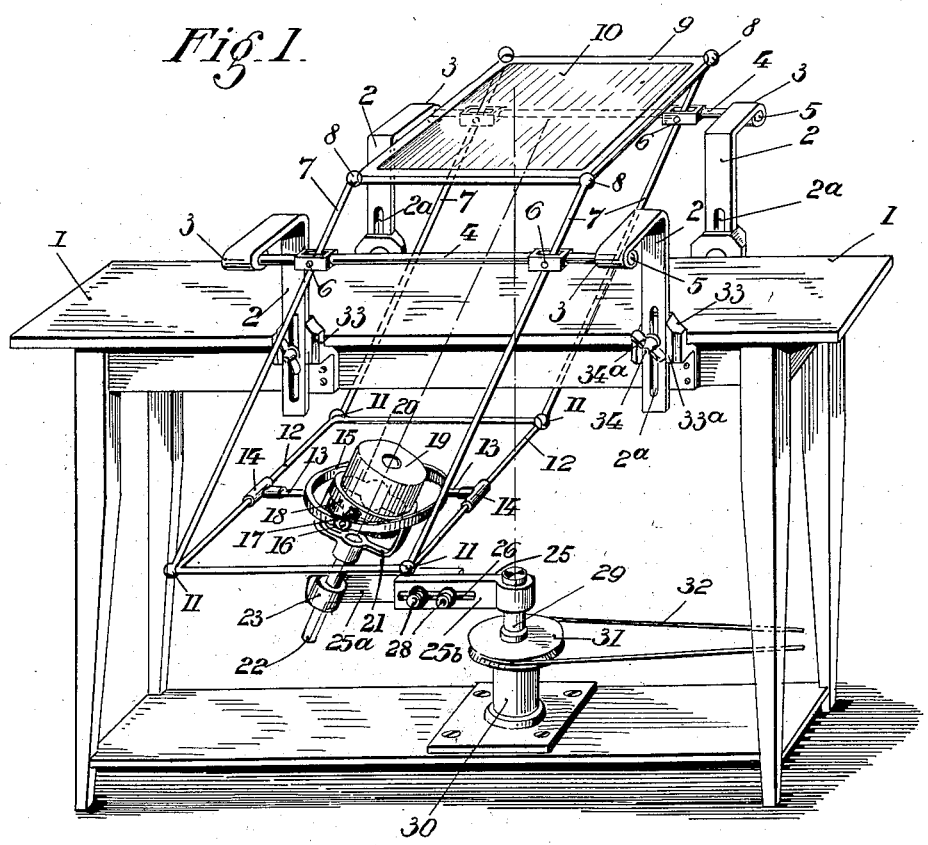
Figure 4:
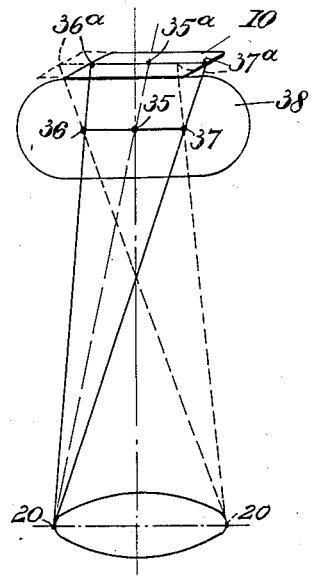
Figure 5:
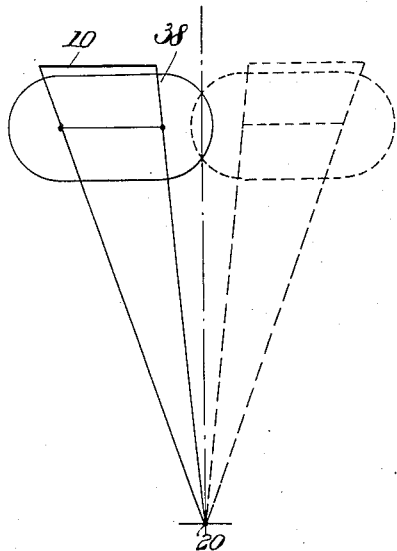
Figure 6:
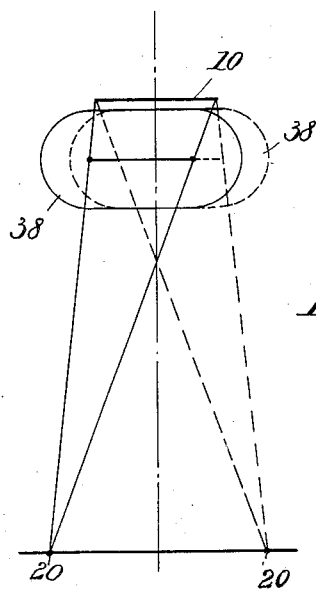

Fig. 4 is a diagrammatical perspective view illustrating the apparatus shown in Fig. 1, and Figs. 5 and 6 are similar diagrammatical views illustrating modifications.

Referring to Fig. 1, the object to be projected is placed on a table 1. On opposite sides of the said table two brackets 2 are fixed which are provided at their top ends with bearings 3. In the said bearings the pivots 5 of two rods 4 disposed at opposite sides of the table are mounted. To the rods 4 pivots 6 are secured on which rods 7 are rockingly supported. The pivots 5 and 6 are disposed perpendicularly to each other, and they provide a universal suspension for the rods 7. There are four rods 7 which are parallel to one another and two of them are located at each side of the table. At their top ends the rods 7 are connected by ball and socket joints 8 with a frame comprising four bars 9, the said bars providing a support for a screen 10 or the casing for the sensitized plate. At their bottom ends the rods 7 are connected by ball and socket joints 11 with a frame consisting of four bars 12. Two bars 12 disposed at opposite sides of the frame are provided with bearings 14 in which pivot bolts 13 of an outer gimbal of a cardanic suspension are mounted. In bearings 16 the axis of which is perpendicular to the axis of the pivot bolts 13 pivot bolts 17 of the inner gimbal ring 18 of the cardanic suspension are mounted. To the ring 18 a box 19 is secured which contains the Röntgen tube 20. To the ring 18 the bifurcated top end 21 of a rod 22 is secured, and the said rod is in sliding engagement with a sleeve 23 secured by means of a bolt 24 to a crank arm 25 carried by a vertical shaft 29. The bolt 24 is fixed in position by means of a nut 24a, and after unscrewing the said nut the sleeve 23 can be rocked for setting the same at different angles on the crank arm 25. The crank arm 25 is made in two sections 25b and 25a, the section 25b being formed with a longitudinal slot 26, and the section 25a being provided with two bores 27. By means of screws 28 passed through the said bores and the slot the sections 25b and 25a can be connected with each other so as to produce a crank arm of the desired length.

The vertical shaft 29 is rotatably mounted in a bearing 30, and it has a pulley 31 fixed thereto, on which a rope 32 is trained, the said rope being connected with a suitable driving mechanism (not shown).

The brackets 2 are mounted on blocks 33 secured to the sides of the table, and they are vertically adjustable in the said blocks. As shown, the brackets are formed with vertical slots 2a engaged by screws 34 carrying wing nuts 34a and secured to the blocks 33. Thus the pivots 6 can be adjusted in vertical direction. The brackets 2 are guided in vertical direction by means of lugs 33a made integral with the blocks 33.

The length of the crank arm 25 and the inclination of the sleeve 23 relatively thereto is set so that the central ray emitted from the Röntgen tube 20 intersects the axis of the shaft 29 in a point located in the plane of the pivots 6 and substantially at the middle of the rectangle provided by the said pivots. When rotating the crank 25 the said point of intersection is not varied, and in the operation of the apparatus the plane including the pivots 6 remains substantially the same. Therefore in the gyratory movement of the system the central ray always passes through the same point of the said plane. Further, the screen 10 and the Röntgen tube 20 always perform proportional movements, so that the said central ray emitted from the tube always passes through the same point of the screen. If therefore the plane of the pivots 6 is set by means of the brackets 2 so that it passes through a certain horizontal section of the body disposed on the table, a definite point of the said section is projected on the screen in the said point of intersection of the central ray and the screen, while all the other points of the body located above and below the said section and successively passed by the central ray of the tube describing a cone are continuously altered, so that they can not produce an image on the screen. The same applies to the other rays emitted from the Röntgen tube.

When changing the position of the plane of the pivots 6 in vertical direction the rod 22 slides in the sleeve 23 of the crank 25. For each vertical displacement of the plane the angular position of the sleeve relatively to the crank must be varied, in order that the point of intersection of the central ray and the axis of the shaft 29 is displaced accordingly. A change of the length of the crank arm 25 is not necessary for this purpose. The length of the crank arm is changed only if it is desired to enlarge or reduce the gyratory movement of the tube and the screen.

The gyratory movement of the system, including the prismatic frame formed by the articulated rods 7, 9 and 12, is that of a conical pendulum, and by the said movement the box 19 containing the Röntgen tube and secured to the inner ring 18 of the cardanic suspension and the said Röntgen tube itself perform a rocking movement relatively to the frame 12.

The operation is illustrated in Fig. 4 with reference to a single vertical plane. In the said figure the numeral 20 indicates the point of emission of the Röntgen rays, 10 is the screen, 35 the point of intersection of the central ray of the Röntgen tube and the plane of the section of the body 38 which is to be projected, while the numerals 36 and 37 indicate two points of the sectional plane located symmetrically thereof. The points 35, 36, 37 are projected in the points 35a, 36a, 37a of the screen, and the said points are not altered during the circular pendulum movement of the tube and the screen.

When moving the body 38 to be projected within its plane while the Röntgen tube 20 is stationary (Fig. 5), the screen or the plate 10 is moved parallel to the body a distance corresponding to the ratio of the distances between the tube and the said plane and the screen.

In the modification shown in Fig. 6 the Röntgen tube 20 and the body 38 are moved parallel to each other at the ratio of the distances between the same and the screen, while the screen or plate 10 is stationary.

By my improved method inner parts of the body or foreign bodies can be approximately reproduced by placing photos one above the other successively made at different heights.

Where shutter for excluding secondary radiation is provided the said shutter must be moved in such manner that its partitions are always located in the direction of the rays.

The method described above is particularly designed for medical purposes. But I wish it to be understood that it may also be used for the purpose of examining other bodies or materials.

I claim:

In an apparatus for controlling the direction of Röntgen ray projections, the combination of a support for the object to be projected, with a prismatic frame comprising articulated members straddling said support, an image carrier mounted in the upper end of the frame above said support, supports for the frame on opposite sides of the object support, pivotal connections between the frame and said supports with the pivots included in a plane parallel to the object support and to the image carrier, a gimbal mounted in the lower end of the frame, a rod extending from the inner element of the gimbal and alined with the axis thereof, a rotatable shaft mounted in a bearing with its axis normal to the center of the plane including the said pivotal connections, means for rotating the shaft, an arm fixed at one end on the shaft, a swivel connecting the other end of the arm with the rod extending from the gimbal, the rotation of the shaft operating through the intervening mechanism to impart conical pendulation to the frame, and a casing enclosing a Röntgen tube and having an opening for the passage of a confined bundle of rays, said casing being mounted on the inner element of the gimbal so that the bundle of rays emanating from the opening will always be directed toward the image carrier.

ERNST POHL.